(12) United States Patent
Lee et al.

(10) Patent No.: US 11,044,066 B2
(45) Date of Patent: Jun. 22, 2021

(54) METHOD AND APPARATUS TRANSMITTING SIDELINK CSI

(71) Applicant: LG Electronics Inc., Seoul (KR)

(72) Inventors: Seungmin Lee, Seoul (KR); Hanbyul Seo, Seoul (KR); Youngdae Lee, Seoul (KR); Giwon Park, Seoul (KR); Jongyoul Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/860,710

(22) Filed: Apr. 28, 2020

(65) Prior Publication Data

US 2020/0304272 A1    Sep. 24, 2020

Related U.S. Application Data

(63) Continuation of application No. PCT/KR2020/003812, filed on Mar. 19, 2020.

(60) Provisional application No. 62/820,289, filed on Mar. 19, 2019.

(51) Int. Cl.
| | |
|---|---|
| *H04L 5/00* | (2006.01) |
| *H04W 72/12* | (2009.01) |
| *H04W 76/14* | (2018.01) |
| *H04W 80/02* | (2009.01) |
| *H04W 92/18* | (2009.01) |

(52) U.S. Cl.
CPC .......... *H04L 5/0057* (2013.01); *H04L 5/0007* (2013.01); *H04L 5/0064* (2013.01); *H04W 72/1242* (2013.01); *H04W 72/1263* (2013.01); *H04W 72/1268* (2013.01); *H04W 72/1284* (2013.01); *H04W 76/14* (2018.02); *H04W 80/02* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2020/0022089 A1* | 1/2020 | Guo | H04W 92/18 |
| 2020/0106566 A1* | 4/2020 | Yeo | H04W 28/04 |

FOREIGN PATENT DOCUMENTS

| | | |
|---|---|---|
| WO | 2018203669 | 11/2018 |
| WO | 2019036578 | 2/2019 |

OTHER PUBLICATIONS

3rd Generation Partnership Project; Technical Specification Group Radio Access Network, "Evolved Universal Terrestrial Radio Access (E-UTRA); Medium Access Control (MAC) protocol specification (Release 15)," 3GPP TS 36.321 V15.4.0, Dec. 2018, 131 pages.

(Continued)

*Primary Examiner* — Mansour Oveissi
(74) *Attorney, Agent, or Firm* — Fish & Richardson P.C.

(57) ABSTRACT

According to an embodiment of the present disclosure, there may be provided a method of transmitting SL CSI by a first apparatus. The method may include generating the SL CSI related to a channel state between the first apparatus and a second apparatus in a MAC CE format, and transmitting the SL CSI to the second apparatus.

13 Claims, 23 Drawing Sheets

(56) References Cited

OTHER PUBLICATIONS

Intel Corporation, Uu-based Sidelink Resource Allocation for V2X Use Cases, R1-1902486, 3GPP TSG RAN WG1 Meeting #96, Athens, Greece, Feb. 25-Mar. 1, 2019, 10 pages.
PCT International Search Report in International Appln. No. PCT/KR2020/003812, dated Jun. 26, 2020, 6 pages (with English translation).
Samsung, Considerations on Sidelink CSI, R1-1902279, 3GPP TSG RAN WG1 #96, Athens, Greece, Feb. 25-Mar. 1, 2019, 6 pages.

* cited by examiner

FIG. 17 receiving, from first apparatus, SL CSI in
MAC CE format related to channel state      ～S1710
between first apparatus and second apparatus

METHOD AND APPARATUS TRANSMITTING SIDELINK CSI

CROSS-REFERENCE TO RELATED APPLICATIONS

Pursuant to 35 U.S.C. § 119(e), this application is a continuation of International Application No. PCT/KR2020/003812, with an international filing date of Mar. 19, 2020, which claims the benefit of U.S. Provisional Application No. 62/820,289 filed on Mar. 19, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM(Basic Safety Message), CAM(Cooperative Awareness Message), and DENM(Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

The present disclosure provides a sidelink (SL) communication method between apparatuses (or UEs) based on vehicle-to-everything (V2X) communication, and an apparatus (or UE) performing the method.

The present disclosure also provides a method and apparatus performing long-term evolution (LTE) SL communication between apparatuses based on V2X communication in a wireless communication system.

The present disclosure also provides a method and apparatus for transmitting SL channel state information (CSI) to another apparatus through a MAC control element (CE).

According to an embodiment of the present disclosure, there may be provided a method of transmitting SL CSI by a first apparatus. The method may include generating the SL CSI related to a channel state between the first apparatus and a second apparatus in a MAC CE format, and transmitting the SL CSI to the second apparatus.

According to an embodiment of the present disclosure, there may be provided a first apparatus for transmitting SL CSI. The first apparatus may include at least one memory storing instructions, at least one transceiver, and at least one processor connected to the at least one memory and the at least one transceiver. The at least one processor may be configured to generate the SL CSI related to a channel state between the first apparatus and a second apparatus in a MAC CE format, and control the at least one transceiver to transmit the SL CSI to the second apparatus.

According to an embodiment of the present disclosure, there may be provided an apparatus (or a chip(set)) configured to control a first UE. The apparatus may include at least one processor, and at least one computer memory operably connectable to the at least one processor, and storing instructions. The at least one processor may execute the instructions to generate the SL CSI related to a channel state between the first apparatus and a second apparatus in a MAC CE format, and transmit the SL CSI to the second apparatus.

According to an embodiment of the present disclosure, there may be provided a non-transitory computer-readable storage medium having instructions (or indications) stored thereon. When executed by at least one processor, the instructions may cause the at least one processor to generate, by a first apparatus, SL CSI related to a channel state between the first apparatus and a second apparatus in a MAC CE format, and transmit, by the first apparatus, the SL CSI to the second apparatus.

According to an embodiment of the present disclosure, there is provided a method of receiving SL CSI by a second apparatus. The method may include receiving, from a first apparatus, SL CSI of a MAC CE format related to a channel state between the first apparatus and the second apparatus.

According to an embodiment of the present disclosure, there is provided a second apparatus for receiving SL CSI. The second apparatus may include at least one memory storing instructions, at least one transceiver, and at least one processor connected to the at least one memory and the at least one transceiver. The at least one processor may control the at least one transceiver to receive, from a first apparatus, SL CSI of a MAC CE format related to a channel state between the first apparatus and the second apparatus.

According to the present disclosure, a user equipment (UE) (or apparatus) can effectively perform sidelink (SL) communication.

According to the present disclosure, vehicle-to-everything (V2X) communication can be effectively performed between apparatuses (or UEs).

According to the present disclosure, SL channel state information (CSI) reporting efficiency can be increased by transmitting SL CSI to another apparatus through a medium access control (MAC) control element (CE).

BRIEF DESCRIPTION OF THE DRAWINGS

FIG. 17 is a flowchart showing an operation of a second apparatus, in accordance with an embodiment of the present disclosure.

DESCRIPTION OF EXEMPLARY EMBODIMENTS

Figure 1:
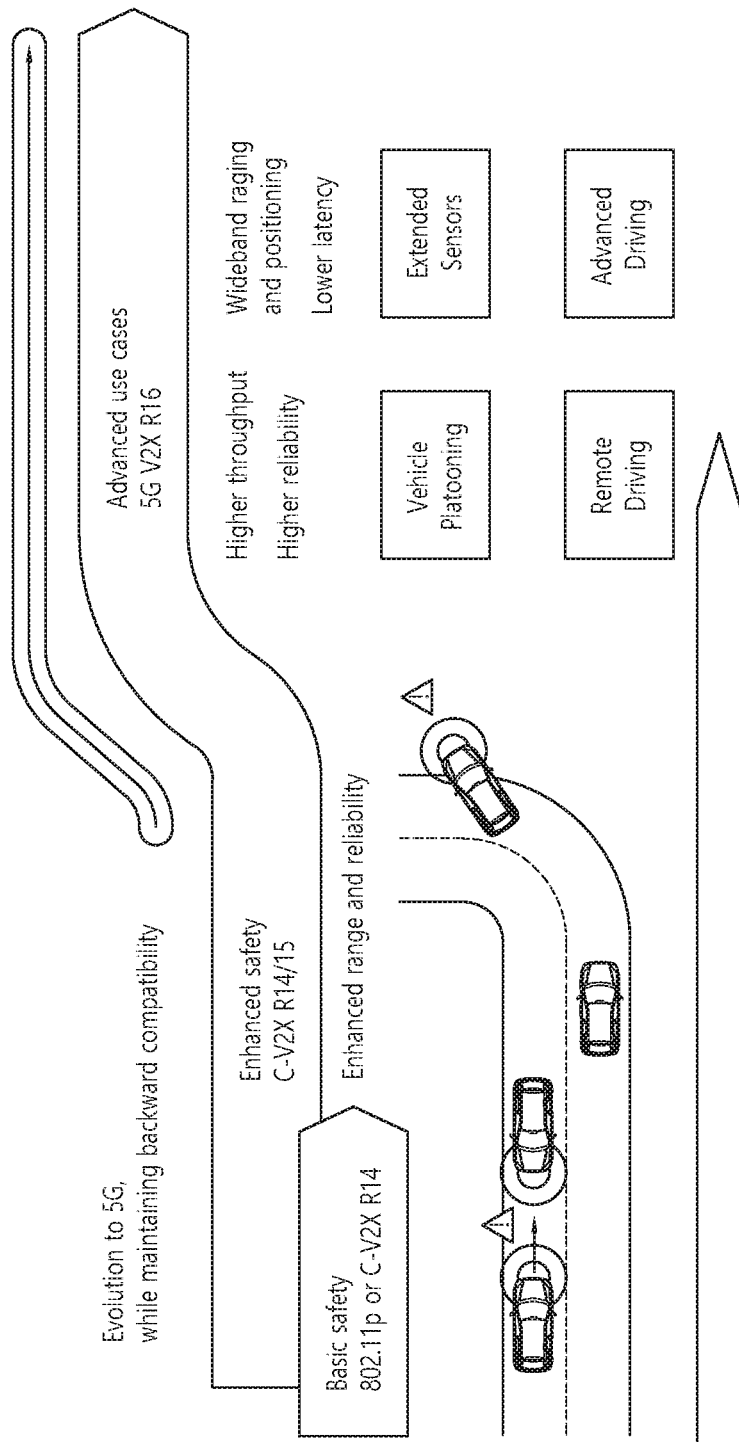
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
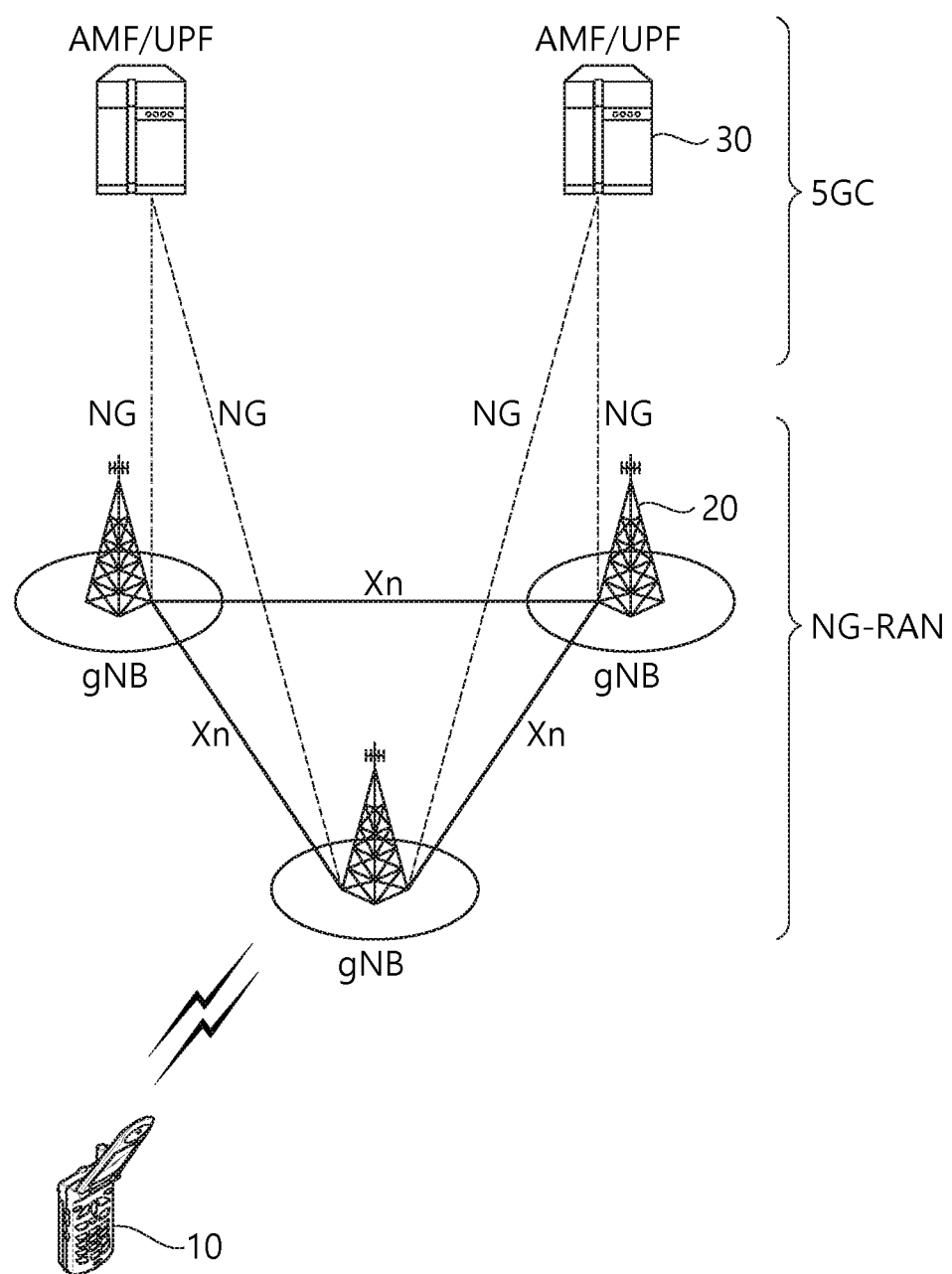
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
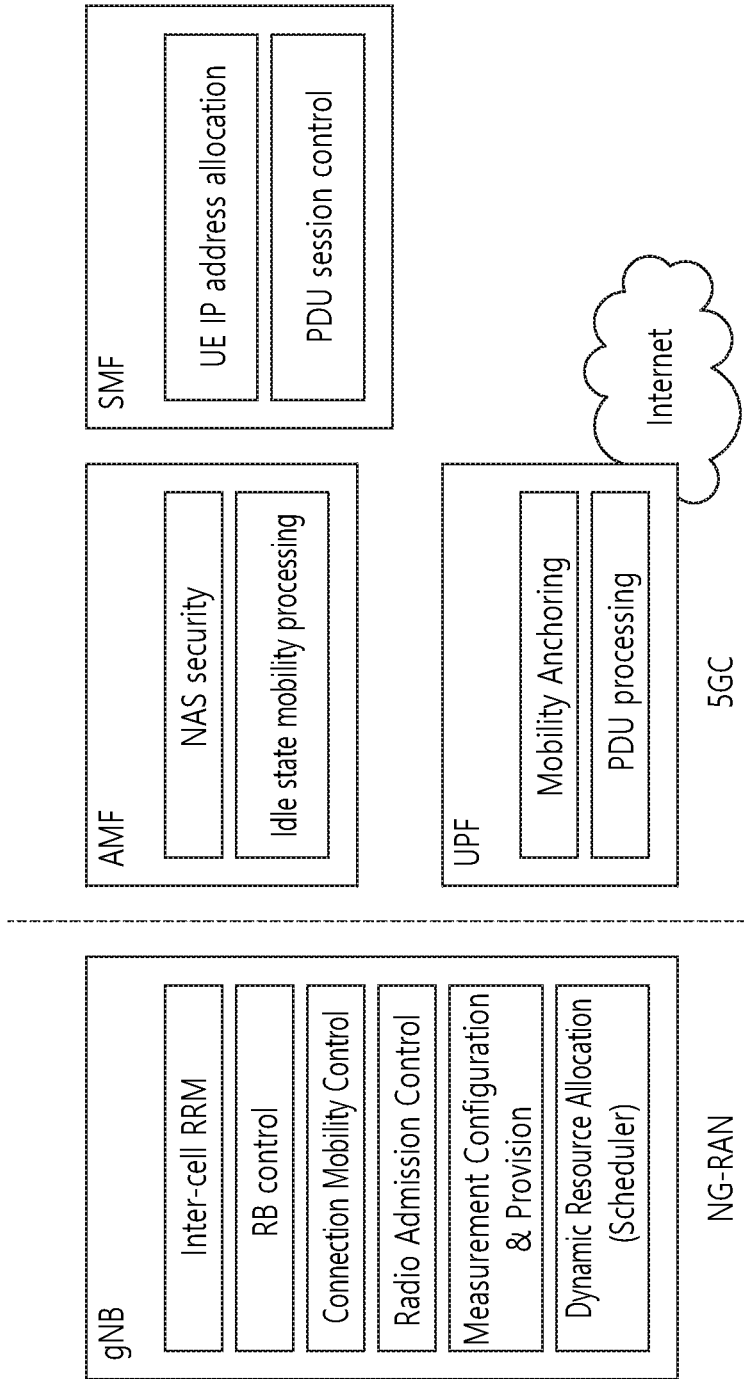
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
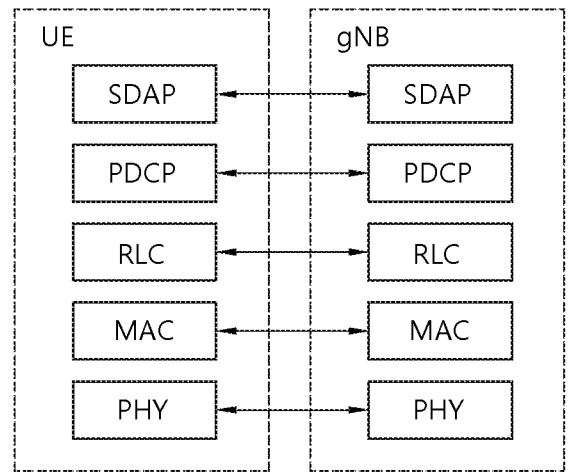
FIGS. 4A and 4B show a radio protocol architecture, in accordance with an embodiment of the present disclosure.
Figure 4B:
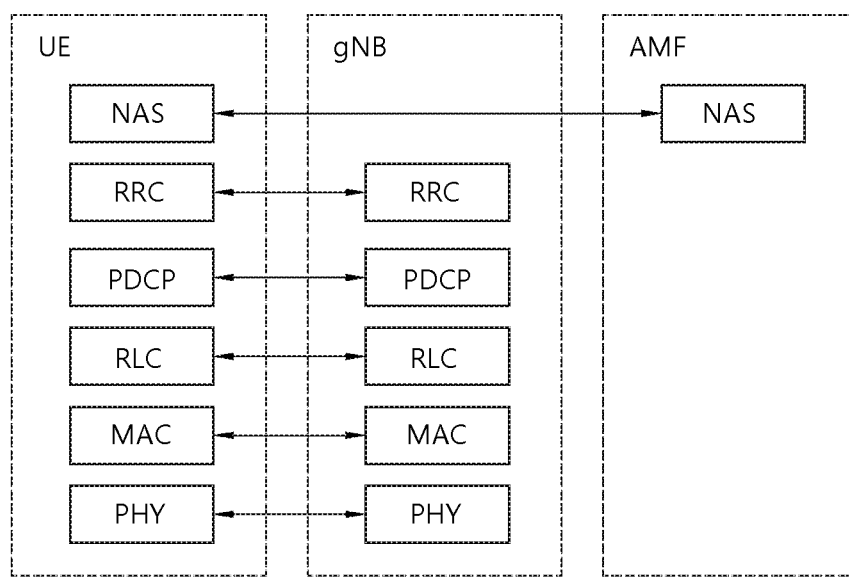

FIGS. 4A and 4B show a radio protocol architecture, in accordance with an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
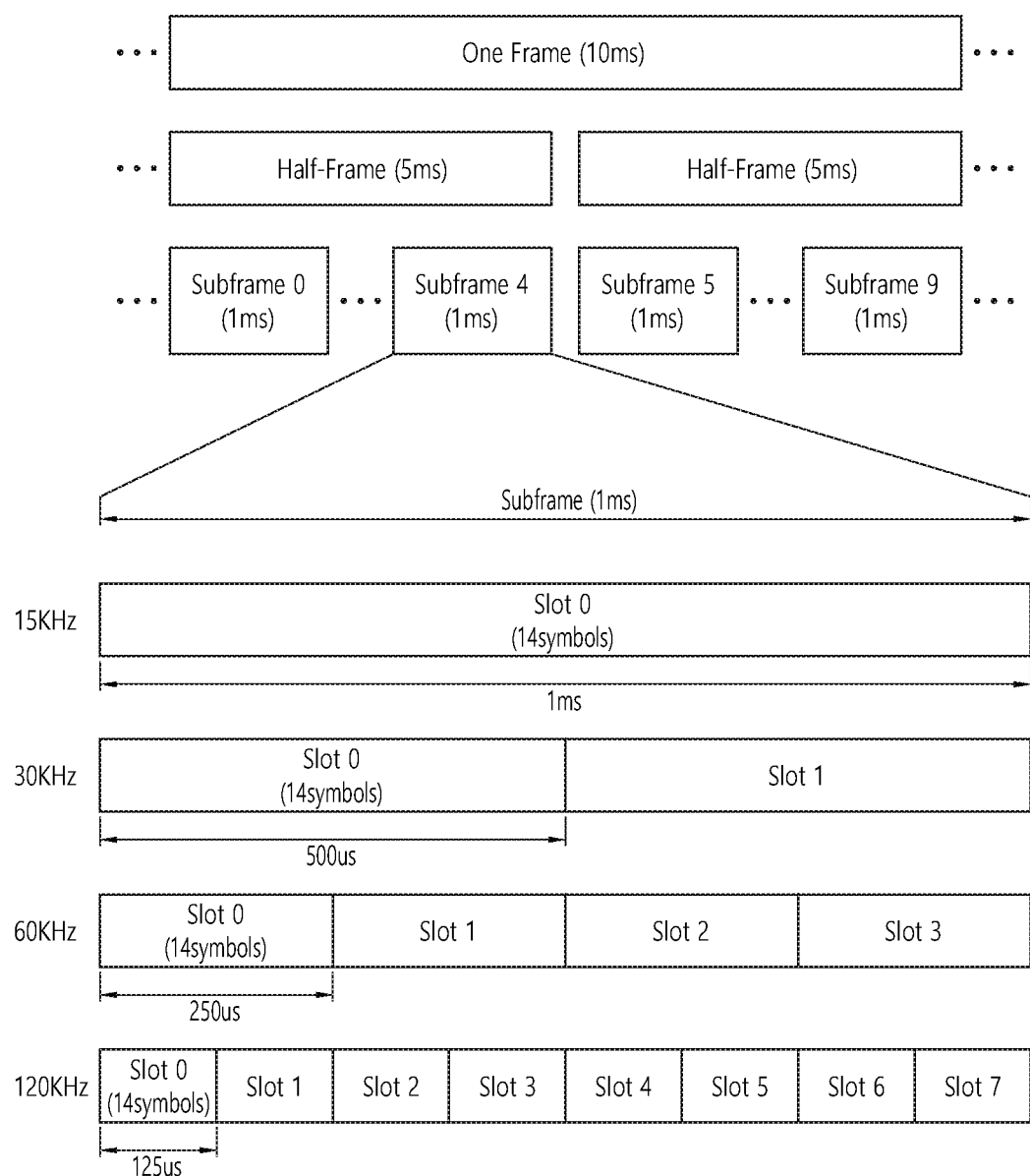
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
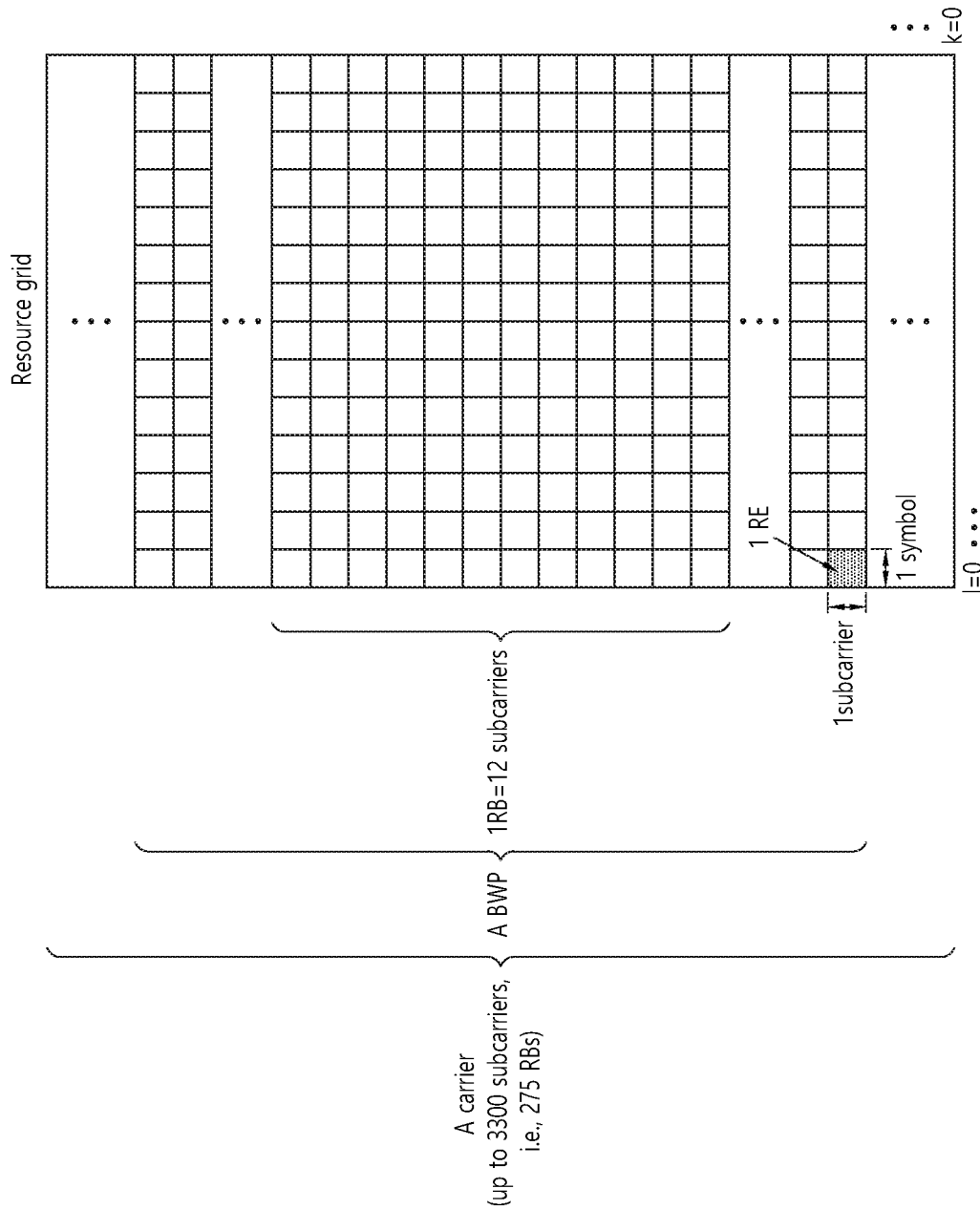
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
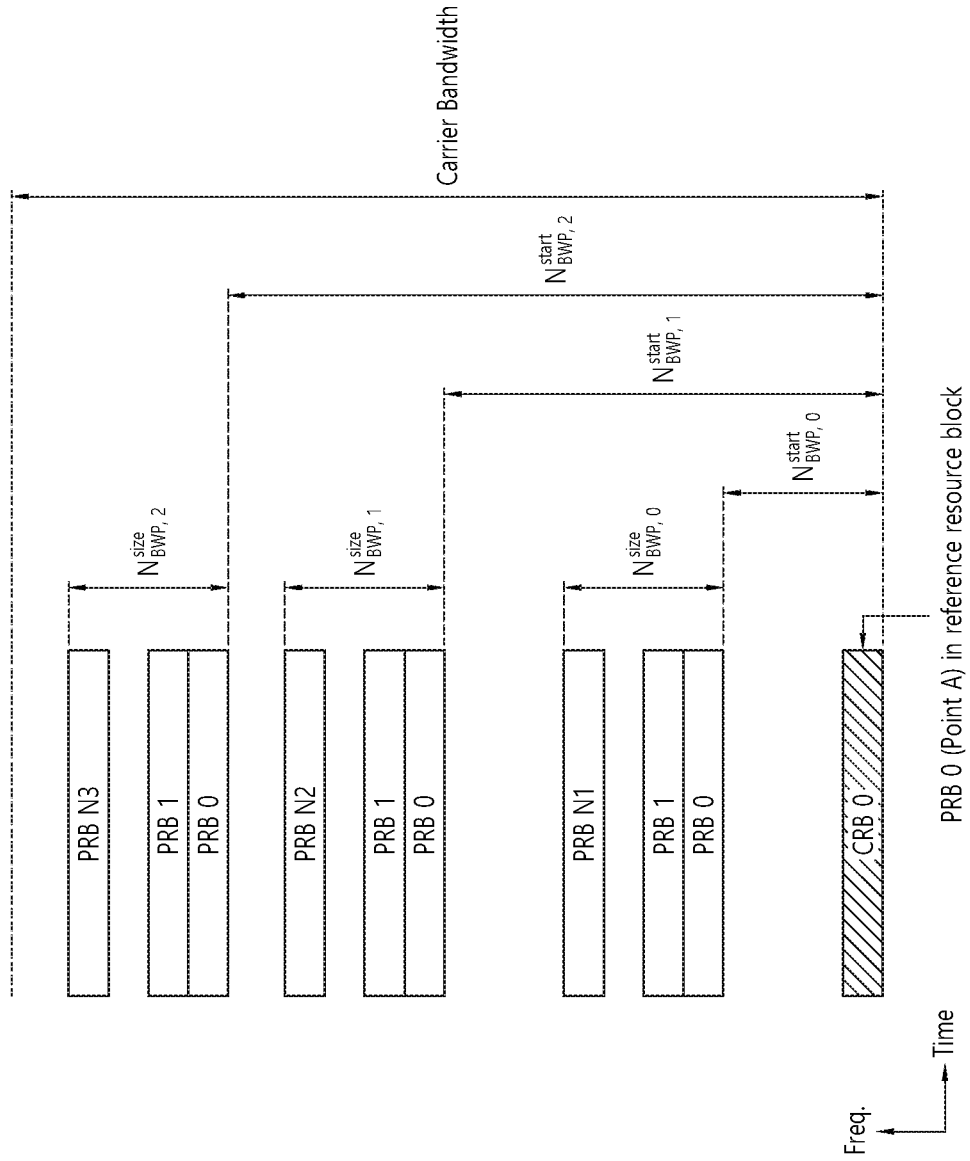
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
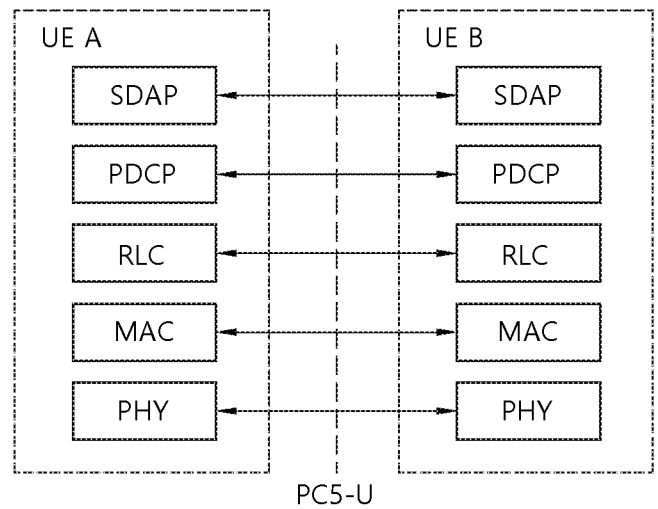
FIGS. 8A and 8B show a radio protocol architecture for a SL communication, in accordance with an embodiment of the present disclosure.
Figure 8B:
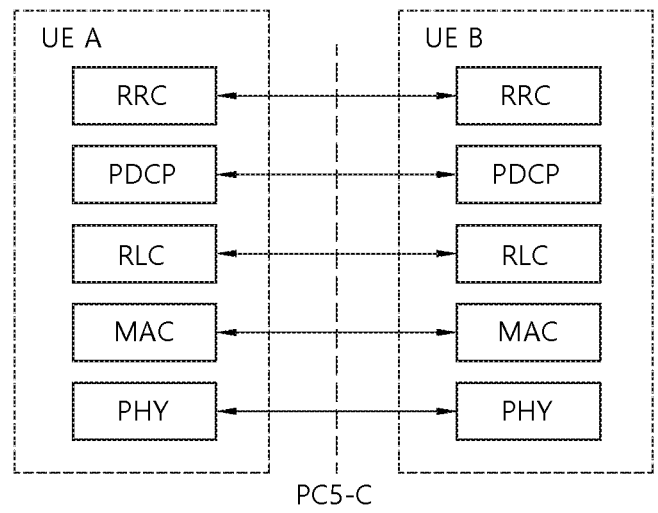

FIGS. 8A and 8B show a radio protocol architecture for a SL communication, in accordance with an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
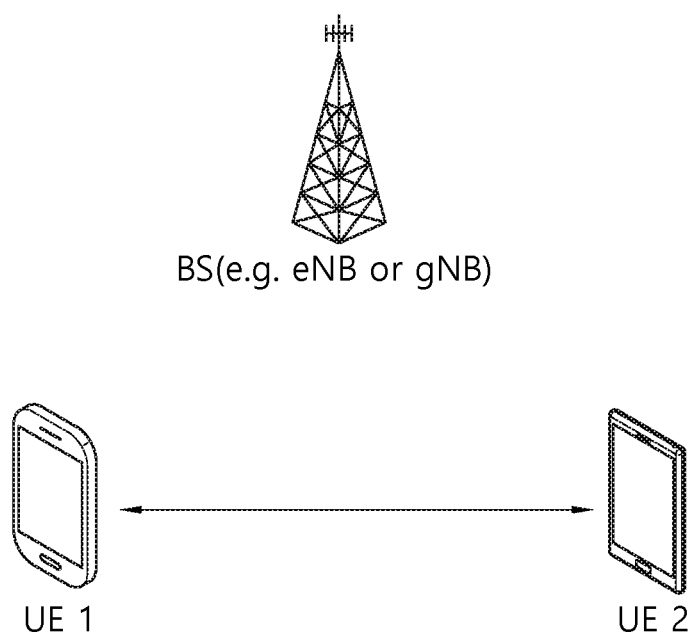
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figures 10A, 10B:
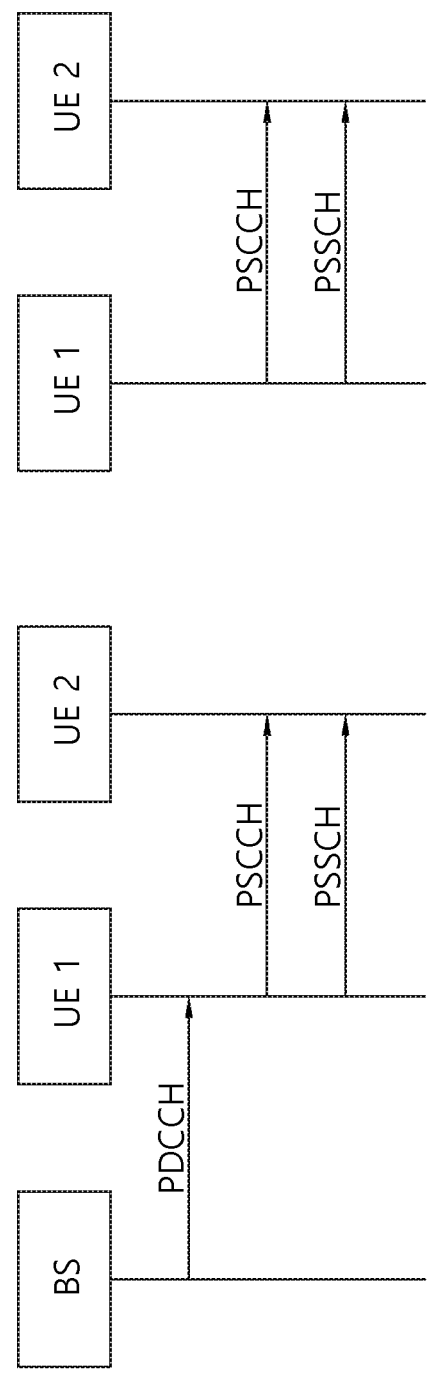
FIGS. 10A and 10B show a procedure of performing V2X or SL communication by a UE based on a transmission mode, in accordance with an embodiment of the present disclosure.

FIGS. 10A and 10B show a procedure of performing V2X or SL communication by a UE based on a transmission mode, in accordance with an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11C:
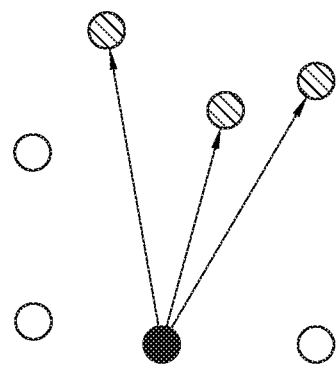
FIGS. 11A to 11C show three cast types, in accordance with an embodiment of the present disclosure.
Figure 11B:
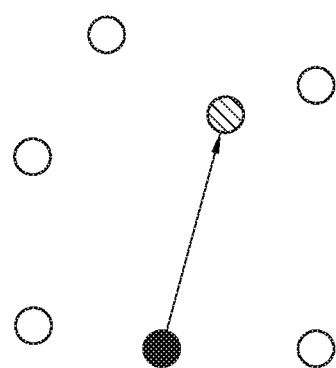
Figure 11A:
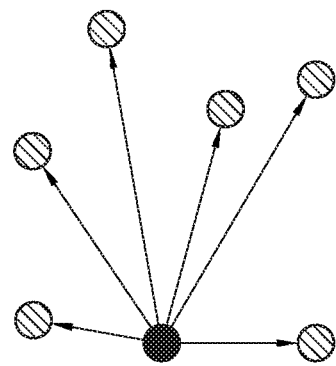

FIGS. 11A to 11C show three cast types, in accordance with an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, etc.) or V2X communication but also to sidelink communication or V2X communication based on a Uu interface (e.g., PUSCH, PDSCH, PDCCH, PUCCH, etc.).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or a WAN DL signal (e.g., PDCCH, PDSCH, PSS/SSS, etc.). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS. etc.). The transmitting operation of the UE may include a transmitting operation of a WAN UL channel and/or a WAN UL signal (e.g., PUSCH, PUCCH, SRS, etc.). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

Hereinafter, a physical channel and signal transmission procedure will be described.

Figure 12:
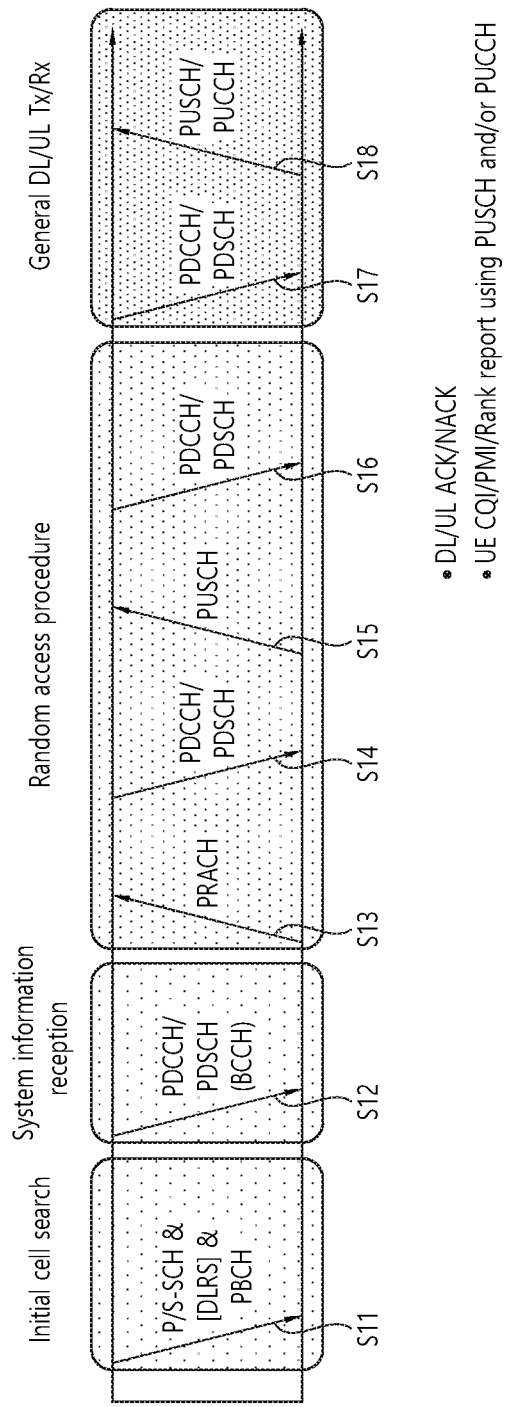
FIG. 12 shows an example of physical channel and signal transmission to which the present disclosure is applicable.

FIG. 12 shows an example of physical channel and signal transmission to which the present disclosure is applicable.

Referring to FIG. 12, in step S11, a UE which is powered on again in a power-off state or which newly enters a cell may perform an initial cell search operation such as synchronization with a BS. To this end, the UE may receive a primary synchronization channel (PSCH) and a secondary synchronization channel (SSCH) from the BS to synchronize with the BS, and may acquire information such as a cell identity (ID). In addition, the UE may receive a physical broadcast channel (PBCH) from the BS to acquire broadcast information in a cell. In addition, in step of initial cell search, the UE may receive a downlink reference signal (DL RS) to check a downlink channel state.

In step S12, the UE which has completed the initial cell search may receive a physical downlink control channel (PDCCH) and its corresponding physical downlink shared channel (PDSCH) to acquire more specific system information.

Thereafter, in steps S13 to S16, the UE may perform a random access procedure to complete an access to the BS. Specifically, in step S13, the UE may transmit a preamble through a physical random access channel (PRACH), and in step S14, the UE may receive a random access response (RAR) for the preamble through a PDCCH and its corresponding PDSCH. Thereafter, in step S15, the UE may use scheduling information in the RAR to transmit a physical uplink shared channel (PUSCH), and in step S16, the UE may perform a contention resolution procedure as in the PDCCH and its corresponding PDSCH.

After performing the aforementioned procedure, in step S17, the UE may receive the PDCCH/PDSCH as a general uplink/downlink signal transmission procedure, and in step S18, the UE may transmit a PUSCH/physical uplink control channel (PUCCH). Control information transmitted by the UE to the BS may be referred to as uplink control information (UCI). The UCI may include hybrid automatic repeat and request (HARD) acknowledgement (ACK)/negative-ACK (HACK), scheduling request (SR), channel state information (CSI), or the like. The CSI may include a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

Hereinafter, cell search will be described.

The cell search is a procedure in which a UE acquires time and frequency synchronization for a cell and detects a physical layer cell ID of the cell. The UE receives a primary synchronization signal (PSS) and a secondary synchronization signal (SSS) to perform the cell search.

The UE shall assume that reception occasions of the PBCH, PSS, and SSS are present across consecutive symbols, and an SS/PBCH block is formed. The UE shall assume that SSS, PBCH DM-RS, and PBCH data have the same EPRE. The UE may assume that a ratio of SSS EPRE to PSS EPRE is 0 dB or 3 dB in an SS/PBCH block of a corresponding cell.

The cell search procedure of the UE may be summarized as shown in Table 5 below.

TABLE 5

| | Signal type | Action |
| --- | --- | --- |
| Step 1 | PSS | Acquire SS/PBCH block (SSB) symbol timing<br>Search for cell ID within cell ID group (3 hypotheses) |
| Step 2 | SSS | * Detect cell ID group (336 hypotheses) |
| Step 3 | PBCH DMRS | SSB index and half frame index (Detect slot and frame boundary) |
| Step 4 | PBCH | Time information (80 ms, SFN, SSB index, HF)<br>* Configure RMSI CORESET/search space |
| Step 5 | PDCCH and PDSCH | Cell access information<br>* Configure RACH |

Meanwhile, under a communication environment between the BS and the UE according to an embodiment, when the UE reports aperiodic CSI (hereinafter, referred to as A-CSI), the BS may use, for example, an uplink grant to trigger the A-CSI reporting to the UE or to allocate a resource to be used in the A-CSI reporting. In this case, from a perspective of the UE, it may not be necessary to perform an independent scheduling request (SR) and/or buffer status report (BSR) procedure for the A-CSI reporting. However, an operation in which a mode-1 UE reports sidelink (SL) communication-related A-CSI (hereinafter, SL A-CSI) to the BS or reports the SL A-CSI to another UE (which has triggered SL A-CSI reporting) may be triggered for the mode-1 UE (even if it is not recognized in advance by the BS) according to whether a predetermined condition is satisfied, a change in SL channel quality, how frequently a data transmission failure occurs (or SL HARQ feedback information), or the like. In an embodiment, the "condition" may be defined as a case where SL resource reselection is performed and/or a case where SL channel busy ratio (CBR) value is changed more than a predetermined threshold compared to a previous (report) value and/or a case where an SL reference signal received power (RSRP) value (between UEs) is changed more than a predetermined threshold compared to a previous (report) value and/or a case where a reference signal received quality (RSRQ) value (between UEs) is changed more than a predetermined threshold compared to a previous (report) value and/or a case where a received signal strength indicator (RSSI) value (between UEs) is changed more than a predetermined threshold compared to a previous (report) value and/or a case where an SL reference signal received power (RSRP) value (between UEs) is increased (or decreased) compared to a predetermined threshold and/or a case where a reference signal received quality (RSRQ) value (between UEs) is increased (or decreased) compared to a predetermined threshold and/or a case where a received signal strength indicator (RSSI) (between UEs) is increased (or decreased) compared to a predetermined threshold and/or a case where an SL channel quality indication (CQI) value (between UEs) is changed more than a predetermined threshold compared to a previous (report) value and/or a case where a precoding matrix indicator (PMI) value (between UEs) is changed more than a predetermined threshold compared to a previous (report) value and/or a case where a rank indicator (RI) value (between UEs) is changed more than a predetermined threshold compared to a previous (report) value and/or a case where an SL channel quality indication (CQI) value (between UEs) is increased (or decreased) compared to a predetermined threshold and/or a case where a precoding matrix indicator (PMI) value (between UEs) is increased (or decreased) compared to a predetermined threshold and/or a case where a rank indicator (RI) value (between UEs) is increased (or decreased) compared to a predetermined threshold and/or a case where a PC5 RRC connection is (re)established between UE, or the like.

Accordingly, in case of the mode-1 UE which performs SL communication (e.g., unicast communication) with another UE, an independent SR procedure (different from a case of UL data transmission) may be performed to request and/or allocate a resource for SL A-CSI reporting to (its serving) BS. Alternatively, in case of the mode-1 UE which performs SL communication (e.g., unicast communication) with another UE, an independent SR procedure and/or BSR procedure (different from a case of UL data transmission) may be performed for (its serving) BS to request and/or allocate a resource for SL A-CSI reporting.

In an embodiment, when the mode-1 UE performs the SL A-CSI reporting for (its serving) BS, a resource requested through the SR (and/or BSR) procedure may be a UL resource (e.g., PUSCH), and when the mode-1 UE performs the SL A-CSI reporting for another UE, the resource requested through the SR (and/or BSR) procedure may be an SL resource (e.g., PSCCH/PSSCH). For example, when the mode-1 UE performs the SL A-CSI reporting for another UE which has triggered the SL A-CSI reporting, the resource requested through the SR (and/or BSR) procedure may be the SL resource (e.g., PSCCH/PSSCH).

In an embodiment, the SL A-CSI information may be defined in a MAC CE format, and an (independent) SR (and/or BSR) procedure may be performed to request and/or allocate a resource for the SL A-CSR reporting.

In an embodiment, generating and/or reporting of SL A-CSI information on a PHY layer may be included as a triggering condition of an SR procedure of a MAC layer. In an embodiment, triggering of the generating and/or reporting of SL A-CSI information on a PHY layer may be included as the triggering condition of the SR procedure of the MAC layer. In an embodiment, SL A-CSI reporting based on a PUSCH (or PSSCH) piggyback on the PHY layer may be included as the triggering condition of the SR procedure of the MAC layer. In an embodiment, triggering of the SL A-CSI reporting based on a PUSCH (or PSSCH) piggyback on the PHY layer may be included as the triggering condition of the SR procedure of the MAC layer. In an embodiment, SL A-CSI reporting based on a PUSCH (or PSSCH) piggyback on the PHY layer may be included as the triggering condition of the SR procedure and/or BSR procedure of the MAC layer. In an embodiment, generating and triggering of SL A-CSI information on the PHY layer may be included as the triggering condition of the SR procedure and/or BSR procedure of the MAC layer. In an embodiment, triggering of the generating and triggering of SL A-CSI information on the PHY layer may be included as the triggering condition of the SR procedure and/or BSR procedure of the MAC layer.

In an embodiment, when the mode-1 UE performs SL A-CSI reporting for the BS, the SR procedure may be interpreted as a UL grant request procedure. In an embodiment, when the mode-1 UE performs the SL A-CSI reporting for (its serving) BS, the SR (and/or BSR) procedure may be interpreted as a UL grant request procedure (for resource allocation (e.g., PUSCH) for the SL A-SCI reporting).

In addition, in an embodiment, when the mode-1 UE performs the SL A-CSI reporting for another UE, the SR procedure may be interpreted as the SL grant request procedure. In an embodiment, when the mode-1 UE performs the SL A-CSI reporting to another UE (which has triggered the SL A-CSI reporting), the SR (and/or BSR) procedure may be interpreted as the SL grant request procedure (for resource allocation (e.g., PSCCH/PSSCH) for the SL A-SCI reporting).

In an embodiment, the UE may use a container of a MAC CE format (or a container of a PHY signaling format) when reporting the SLA-CSI to the BS, and the UE may use the container based on PHY signaling (or the container of the MAC CE format) when reporting the SL A-CSI to another UE. For example, the UE may use the container of the MAC CE format (or the container of the PHY signaling format) when reporting the SL A-CSI to (its serving) BS, and the UE may use the container based on PHY signaling (or the container of the MAC CE format) when reporting the SL A-CSI to another UE (which has triggered the SL A-CSI reporting). That is, a container to be used may be different when a reporting target is different. In addition, in an embodiment, the proposed content is not limited to "MAC CE", and is also extendedly applicable to a case of using another container including L3 signaling (e.g., RRC) or the like.

When the UE transmits only the SLA-CSI through the PSSCH, a QoS parameter (e.g., priority) (e.g., sensing purpose) on an associated PSCCH may be predetermined.

In addition, the proposed scheme described above is also extendedly applicable not only when the mode-1 UE performs SL A-CSI reporting to the BS but also when the mode-1 UE reports the SL A-CSI to another UE and when requesting the BS to allocate an SL resource related to the SL A-CSI reporting. For example, the proposed scheme described above is also extendedly applicable not only when the mode-1 UE performs SL A-CSI reporting to (its serving) BS but also when the mode-1 UE reports the SL A-CSI to another UE (which has triggered the SL A-CSI reporting) and when requesting to (its serving) BS to allocate the SL resource related to the SL A-CSI reporting.

The mode 1 may indicate a mode in which the BS schedules a resource related to SL communication (e.g., SL transmission) to the UE, and the mode 2 may indicate a mode in which the UE independently selects the resource related to SL communication (e.g., SL transmission) within a resource pool configured in advance (from a network).

Figure 13:
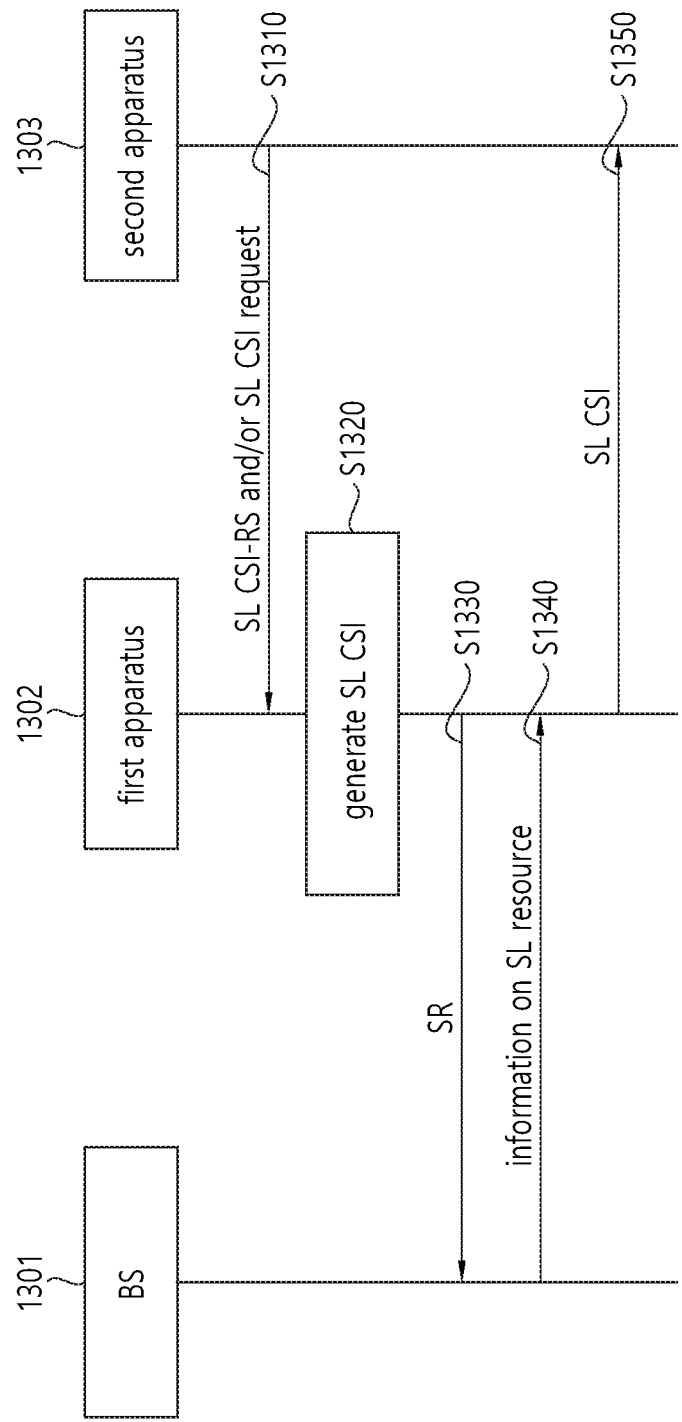
FIG. 13 shows a process in which a first apparatus transmits SL CSI to a second apparatus, based on communication with a BS, in accordance with an embodiment of the present disclosure.

FIG. 13 shows a process in which a first apparatus transmits SL CSI to a second apparatus, based on communication with a BS, in accordance with an embodiment of the present disclosure.

As shown in FIG. 13, a first apparatus 1302 according to an embodiment may report (or transmit) SL-CSI to another UE (a second apparatus 1303 in case of FIG. 13). The first apparatus 1302 according to an embodiment may correspond to a mode-1 UE.

A process in which the first apparatus 1302 reports SL-SCI to the second apparatus 1303 is specified as follows.

In step S1310, the first apparatus 1302 according to an embodiment may receive an SL CSI-RS and/or SL CSI request from the second apparatus 1303. In an embodiment, generating and/or transmitting (or reporting) of the SL CSI may be triggered in the first apparatus 1302, based on the SL CSI-RS and/or SL CSI request. However, step S1310 is not an essential procedure required when the first apparatus 1302 transmits SL CSI to the second apparatus 1303. The first apparatus 1302 according to an embodiment may transmit the SL CSI, based on step S1320 to step S1350, except for step S1310.

In an embodiment, generating and/or transmitting (or reporting) of the SL CSI of the first apparatus 1302 may be triggered based on at least one of cases where the SL resource is reselected, where an SL channel busy ratio (CBR) value is increased compared to a predetermined threshold, where a reference signal received power (RSRP) value is increased compared to a predetermined threshold, where the RSRP value is increased compared to a predetermined threshold, where a received signal strength indicator (RSSI) value is increased compared to a predetermined threshold, where an SL CQI value is increased compared to a predetermined threshold, where an SL PMI value is increased compared to a predetermined threshold, where an SL RI value is increased compared to a predetermined threshold, and where a PC5 RRC connection is established between UEs.

In step S1320, the first apparatus 1302 according to an embodiment may generate SL CSI. In an embodiment, the SL CSI may be generated in a PHY layer of the first apparatus 1302. In an embodiment, the SL CSI may be transferred from the PHY layer of the first apparatus 1302 to a MAC layer of the first apparatus 1302.

In step S1330, the first apparatus 1302 according to an embodiment may transmit a scheduling request (SR) to a BS 1301. In an embodiment, the SR may be triggered by the SL CSI transferred from the PHY layer to the MAC layer. In an embodiment, the SR may be triggered in the MAC layer, based on the SL CSI transferred from the PHAY layer to the MAC layer.

In step S1340, the first apparatus 1302 according to an embodiment may receive information on an SL resource from the BS 1301. The information on the SL resource may be determined and/or generated by the BS 1301, based on the SR.

In step S1350, the first apparatus 1302 according to an embodiment may transmit SL CSI to the second apparatus 1303. In an embodiment, the SL CSI may be transmitted to the second apparatus 1303 through a MAC CE, on an SL resource derived based on the information on the SL resource received from the BS 1301.

Figure 14:
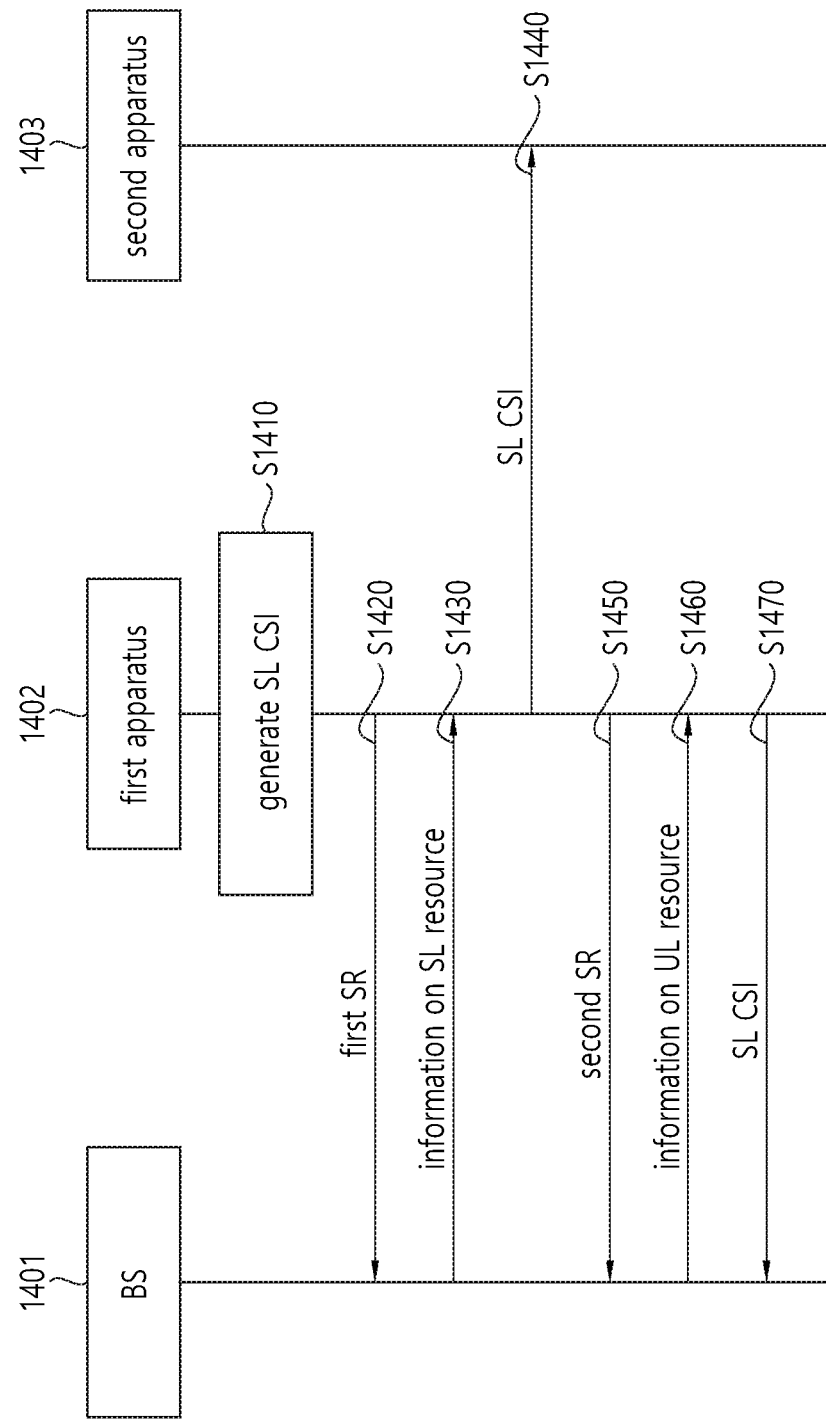
FIG. 14 shows a process in which a first apparatus transmits SL CSI to a BS or a second apparatus, based on communication with the BS, in accordance with another embodiment of the present disclosure.

FIG. 14 shows a process in which a first apparatus transmits SL CSI to a BS or a second apparatus, based on communication with the BS, in accordance with another embodiment of the present disclosure.

As shown in FIG. 14, a first apparatus 1402 according to an embodiment may not only report (or transmit) SL-CSI to another UE (a second apparatus 1403 in case of FIG. 14) but also report (or transmit) SL-CSI to a BS 1401. The first apparatus 1402 according to an embodiment may correspond to a mode-1 UE.

Meanwhile, an embodiment in which the first apparatus 1402 reports the SL-CSI to the second apparatus 1303 or 1403 and/or the BS 1301 or 1401 is not limited to FIG. 13 and FIG. 14. For example, the first apparatus 1402 may report the SL-CSI only to the BS 1401.

Meanwhile, although it is described in FIG. 14 that the first apparatus 1402 first reports the SL-CSI to the second apparatus 1403 (S1440) and then reports the SL-CSI to the BS 1401 (S1470), an embodiment is not limited thereto. For example, the first apparatus 1402 may first report the SL-CSI to the BS 1401 and then may report the SL-CSI to the second apparatus 1403. In addition, it will be easily understood by those ordinarily skilled in the art that operation orders are not limited by reference numerals indicated in FIG. 13 and FIG. 14.

Since steps S1410 to S1440 of FIG. 14 perform a function identical or similar to steps S1310 to S1340 of FIG. 13, descriptions on step S1410 to S1440 will be omitted.

In step S1450, the first apparatus 1402 according to an embodiment may transmit a second SR to the BS 1401 (S1450). The second SR may be different from the first SR transmitted to the BS 1401 to acquire information on an SL resource.

In step S1460, the first apparatus 1402 according to an embodiment may receive information related to a UL resource determined based on the second SR from the BS 1401 (S1460). In an embodiment, the information related to the UL resource (or the information on the UL resource may be included in a UL grant transmitted from the BS 1401.

In step S1470, the first apparatus 1402 according to an embodiment may transmit (or report) SL CSI to the BS 1401. In an embodiment, the first apparatus 1402 may transmit the SL CSI to the BS 1401, on a UL resource derived based on the information related to the UL resource received from the BS 1401. In an embodiment, the SL CSI may be transmitted from the first apparatus 1402 to the BS 1401 on the UL resource, through a MAC CE.

Figure 15:
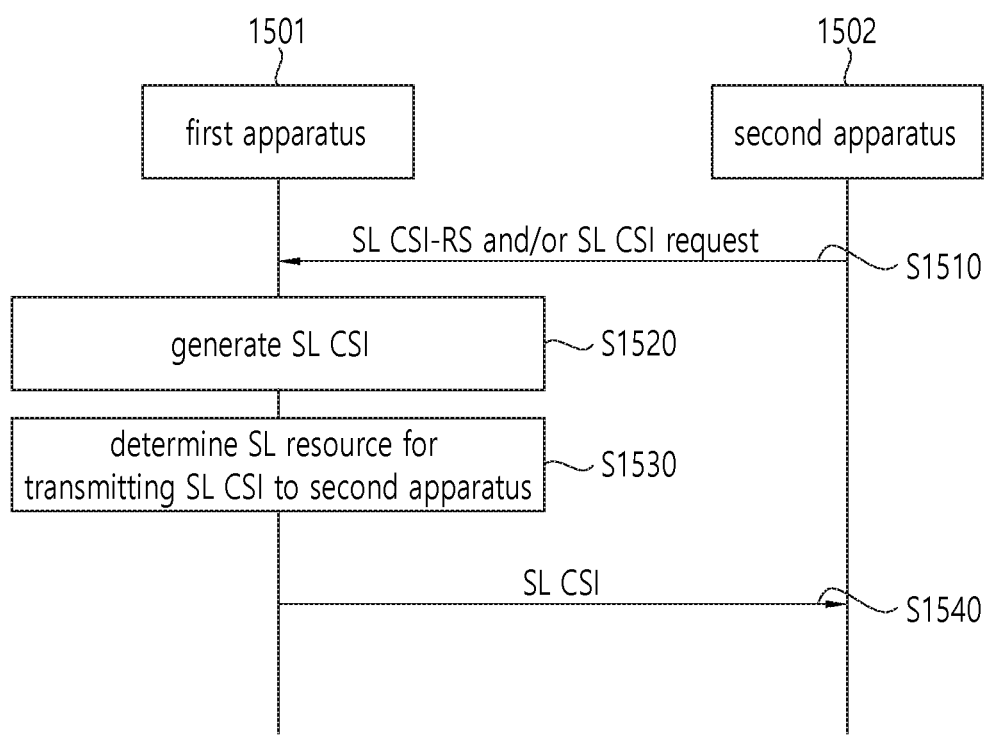
FIG. 15 shows a process in which a first apparatus transmits SL CSI to a second apparatus, in accordance with an embodiment of the present disclosure.

FIG. 15 shows a process in which a first apparatus transmits SL CSI to a second apparatus, in accordance with an embodiment of the present disclosure.

As shown in FIG. 15, a first apparatus 1501 according to an embodiment may report (or transmit) SL-CSI to another UE (a second apparatus 1502 in case of FIG. 15), not based on a result of communication with a BS. The first apparatus 1501 according to an embodiment may correspond to a mode-2 UE.

A process in which the first apparatus 1501 reports SL-SCI to the second apparatus 1502 is specified as follows.

In step S1510, the first apparatus 1501 according to an embodiment may receive an SL CSI-RS and/or SL CSI request from the second apparatus 1502. In an embodiment, generating and/or transmitting (or reporting) of the SL CSI may be triggered in the first apparatus 1501, based on the SL CSI-RS and/or SL CSI request. However, step S1510 is not an essential procedure required when the first apparatus 1501 transmits SL CSI to the second apparatus 1502. The first apparatus 1501 according to an embodiment may transmit the SL CSI, based on step S1520 to step S1540, except for step S1510.

In an embodiment, generating and/or transmitting (or reporting) of the SL CSI of the first apparatus 1501 may be triggered based on at least one of cases where the SL resource is reselected, where an SL channel busy ratio (CBR) value is increased compared to a predetermined threshold, where a reference signal received power (RSRP) value is increased compared to a predetermined threshold, where the RSRP value is increased compared to a predetermined threshold, where a received signal strength indicator (RSSI) value is increased compared to a predetermined threshold, where an SL CQI value is increased compared to a predetermined threshold, where an SL PMI value is increased compared to a predetermined threshold, where an SL RI value is increased compared to a predetermined threshold, and where a PC5 RRC connection is established between UEs.

In step 1520, the first apparatus 1501 according to an embodiment may generate SL CSI. In an embodiment, the SL CSI may be generated in a PHY layer of the first apparatus 1501. In an embodiment, the SL CSI may be transferred from the PHY layer of the first apparatus 1501 to a MAC layer of the first apparatus 1501.

In step S1530, the first apparatus 1501 according to an embodiment may determine an SL resource for transmitting SL CSI to the second apparatus 1502.

In an embodiment, the SL resource for transmitting the SL CSI to the second apparatus 1502 may be a pre-configured resource.

In another embodiment, the SL resource for transmitting the SL CSI to the second apparatus 1502 may be an SL resource determined by the first apparatus 1501, based on resource selection.

In step S1540, the first apparatus 1501 according to an embodiment may transmit the SL CSI to the second apparatus 1502 through the SL resource. In an embodiment, the SL CSI may be transmitted to the second apparatus 1502 through a MAC CE on the SL resource. In an embodiment, the SL CSI may be transmitted to the second apparatus 1502 through the MAC CE, on the SL resource determined based on resource selection.

Figure 16:
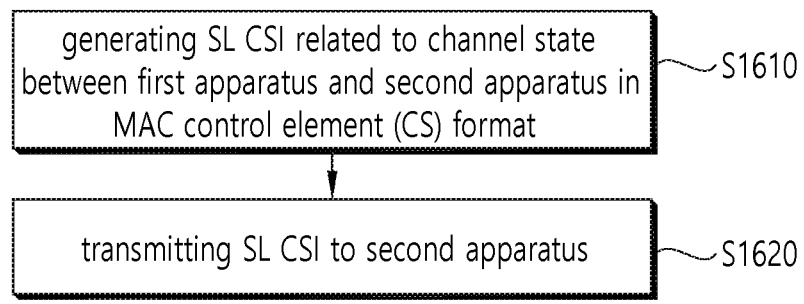
FIG. 16 is a flowchart showing an operation of a first apparatus, in accordance with an embodiment of the present disclosure.

FIG. 16 is a flowchart showing an operation of a first apparatus, in accordance with an embodiment of the present disclosure.

Operations disclosed in the flowchart of FIG. 16 may be performed in combination with various embodiments of the present disclosure. In an embodiment, the operations disclosed in the flowchart of FIG. 16 may be performed based on at least one of apparatuses shown in FIG. 18 to FIG. 23.

In step S1610, the first apparatus according to an embodiment may generate SL CSI related to a channel state between the first apparatus and a second apparatus in a MAC CE format.

In step S1620, the first apparatus according to an embodiment may transmit the SL CSI to the second apparatus.

In an embodiment, the generating of the SL CSI and the transmitting of the SL CSI to the second apparatus may be triggered by PHY layer signaling related to reporting triggering of the SL CSI.

In an embodiment, a priority for the SL CSI of the MAC CE format may be predetermined. That is, the priority for the SL CSI of the MAC CE format may be predefined. The priority for the SL CSI of the MAC CE format may be configured from a BS or may be based on a pre-configuration.

The first apparatus according to an embodiment may transmit a first scheduling request (SR) to the BS.

In an embodiment, the first SR may be triggered by the SL CSI of the MAC CE format, generated by the PHY layer signaling related to the reporting triggering of the SL CSI.

The first apparatus according to an embodiment may receive an SL grant from the BS. The SL CSI may be transmitted to the second apparatus through the MAC CE on an SL resource related to the SL grant.

In an embodiment, the SL grant may be related to the first SR transmitted to the BS.

The first apparatus according to an embodiment may transmit a second SR to the BS, receive a UL grant from the BS, and transmit the SL CSI to the BS on a UL resource related to the UL grant.

In an embodiment, the SL CSI may be transmitted to the BS through the MAC CE on the UL resource In an embodiment, the UL grant may be related to the second SR.

In an embodiment, the SL CSI may include at least one of a channel quality indicator (CQI), a precoding matrix indicator (PMI), and a rank indicator (RI).

In an embodiment, the SL CSI may be transmitted to the BS, based on at least one of cases where the SL resource is reselected, where an SL channel busy ratio (CBR) value is increased compared to a predetermined threshold, where a reference signal received power (RSRP) value is increased compared to a predetermined threshold, where the RSRP value is increased compared to a predetermined threshold, where a received signal strength indicator (RSSI) value is increased compared to a predetermined threshold, where an SL CQI value is increased compared to a predetermined threshold, where an SL PMI value is increased compared to a predetermined threshold, where an SL RI value is increased compared to a predetermined threshold, and where a PC5 RRC connection is established between UEs.

The first apparatus according to an embodiment may determine an SL resource for transmitting the SL CSI to the second apparatus, based on resource selection, and may transmit the SL CSI to the second apparatus through the MAC CE, based on the SL resource.

The first apparatus according to an embodiment may generate the SL CSI related to a channel state between the first apparatus and a second apparatus in a MAC layer in a MAC control element (CE) format.

The first apparatus according to an embodiment may transmit to the BS a first scheduling request (SR) triggered based on the SL CSI of the MAC CE format.

The first apparatus according to an embodiment may receive an SL grant from the BS.

The first apparatus according to an embodiment may transmit the SL CSI to the second apparatus on an SL resource related to the SL grant.

In an embodiment, the transmission of the first SR may be triggered by the PHY layer signaling related to the reporting triggering of the SL CSI.

In an embodiment, a buffer status report (BSR) related to the SL CSI for triggering the transmission of the first SR may not be defined, and the transmission of the first SR may not be triggered by the BSR.

In an embodiment, a first SR configuration for the first SR and a second SR configuration for a second SR triggered based on the BSR may be different from each other, and the BSR related to the second SR configuration may be related to at least one of SL data or UL data not related to the SL CSI of the MAC CE format.

For example, if an SR configuration related to SL data and an SR configuration related to SL CSI are configured independently or differently for a mode-1 UE, the mode-1 UE may apply at least any one of the following options. For example, the SR configuration may include information related to an SR resource, information related to a period, and/or information related to a slot offset, or the like.

1) First Option

For example, when the mode-1 UE simultaneously performs transmission related to SL data and transmission related to SL CSI and/or when the mode-1 UE multiplexes the SL data and the SL CSI on one MAC PDU, the mode-1 UE may transmit an SR to a BS, based on only the SR configuration related to the SL data. Herein, a corresponding rule may be useful in a situation in which a BSR related to SL CSI is not defined (unlike in SL data). In this case, for example, the mode-1 UE may omit SR transmission based on the SR configuration related to the SL CSI.

For example, when the mode-1 UE simultaneously performs transmission related to SL data and transmission related to SL CSI and/or when the mode-1 UE multiplexes the SL data and the SL CSI on one MAC PDU, the mode-1 UE may transmit an SR to the BS, based on only the SR configuration related to the SL CSI. In this case, for example, the mode-1 UE may omit SR transmission based on the SR configuration based on the SL data.

2) Second Option

For example, when the mode-1 UE simultaneously performs transmission related to SL data and transmission related to SL CSI and/or when the mode-1 UE multiplexes the SL data and the SL CSI on one MAC PDU, the mode-1 UE may perform both SR transmission based on the SR configuration related to the SL CSI and SR transmission based on the SR configuration related to the SL data.

3) Third Option

For example, when the mode-1 UE simultaneously performs transmission related to SL data and transmission related to SL CSI and/or when the mode-1 UE multiplexes the SL data and the SL CSI on one MAC PDU, the mode-1 UE may apply the second option (or first option) when a remaining latency budget related to SL CSI reporting is not sufficient for a (processing) relay required in SR transmission based on an SR configuration related to SL CSI reporting. Otherwise, the mode-1 UE may apply the first option (or second option).

According to an embodiment of the present disclosure, there may be provided a first apparatus for transmitting SL CSI. The first apparatus may include at least one memory storing instructions, at least one transceiver, and at least one processor connected to the at least one memory and the at least one transceiver. The at least one processor may be configured to generate the SL CSI related to a channel state between the first apparatus and a second apparatus in a MAC CE format, and control the at least one transceiver to transmit the SL CSI to the second apparatus.

According to an embodiment of the present disclosure, there may be provided an apparatus (or a chip(set)) configured to control a first user equipment (UE). The apparatus may include at least one processor, and at least one computer memory operably connectable to the at least one processor, and storing instructions. The at least one processor may execute the instructions to generate the SL CSI related to a channel state between the first apparatus and a second apparatus in a MAC CE format, and transmit the SL CSI to the second apparatus.

In an embodiment, the first UE of the embodiment may represent the first apparatus described throughout the present disclosure. In an embodiment, the at least one processor, at least one memory, or the like in the apparatus for controlling the first UE may be implemented as respective separate sub chips, or at least two or more components may be implemented through one sub chip.

According to an embodiment of the present disclosure, there may be provided a non-transitory computer-readable storage medium having instructions (or indications) stored thereon. When executed by at least one processor, the instructions may cause the at least one processor to generate, by a first apparatus, SL CSI related to a channel state between the first apparatus and a second apparatus in a MAC CE format, and transmit, by the first apparatus, the SL CSI to the second apparatus.

FIG. 17 is a flowchart showing an operation of a second apparatus, in accordance with an embodiment of the present disclosure.

Operations disclosed in the flowchart of FIG. 17 may be performed in combination with various embodiments of the present disclosure. In an embodiment, the operations disclosed in the flowchart of FIG. 17 may be performed based on at least one of apparatuses shown in FIG. 18 to FIG. 23.

In step S1710, the second apparatus according to an embodiment may receive, from the first apparatus, SL CSI of a MAC CE format related to a channel state between the first apparatus and the second apparatus.

In an embodiment, the generating of the SL CSI and the transmitting of the SL CSI to the second apparatus may be triggered by PHY layer signaling related to reporting triggering of the SL CSI.

In an embodiment, a priority for the SL CSI of the MAC CE format may be predetermined. That is, the priority for the SL CSI of the MAC CE format may be predefined. The priority for the SL CSI of the MAC CE format may be configured from a BS or may be based on a pre-configuration.

The first apparatus according to an embodiment may transmit a first scheduling request (SR) to the BS.

In an embodiment, the first SR may be triggered by the SL CSI of the MAC CE format, generated by the PHY layer signaling related to the reporting triggering of the SL CSI.

The first apparatus according to an embodiment may receive an SL grant from the BS. The SL CSI may be transmitted to the second apparatus through the MAC CE on an SL resource related to the SL grant.

In an embodiment, the SL grant may be related to the first SR transmitted to the BS.

The first apparatus according to an embodiment may transmit a second SR to the BS, receive a UL grant from the BS, and transmit the SL CSI to the BS on a UL resource related to the UL grant.

In an embodiment, the SL CSI may be transmitted to the BS through the MAC CE on the UL resource In an embodiment, the UL grant may be related to the second SR.

In an embodiment, the SL CSI may include at least one of a channel quality indicator (CQI), a precoding matrix indicator (PMI), and a rank indicator (RI).

In an embodiment, the SL CSI may be transmitted to the BS, based on at least one of cases where the SL resource is reselected, where an SL channel busy ratio (CBR) value is increased compared to a predetermined threshold, where a reference signal received power (RSRP) value is increased compared to a predetermined threshold, where the RSRP value is increased compared to a predetermined threshold, where a received signal strength indicator (RSSI) value is increased compared to a predetermined threshold, where an SL CQI value is increased compared to a predetermined threshold, where an SL PMI value is increased compared to a predetermined threshold, where an SL RI value is increased compared to a predetermined threshold, and where a PC5 RRC connection is established between UEs.

The first apparatus according to an embodiment may determine an SL resource for transmitting the SL CSI to the second apparatus, based on resource selection, and may transmit the SL CSI to the second apparatus through the MAC CE, based on the SL resource.

The first apparatus according to an embodiment may generate the SL CSI related to a channel state between the first apparatus and a second apparatus in a MAC layer in a MAC control element (CE) format.

The first apparatus according to an embodiment may transmit to the BS a first scheduling request (SR) triggered based on the SL CSI of the MAC CE format.

The first apparatus according to an embodiment may receive an SL grant from the BS.

The first apparatus according to an embodiment may transmit the SL CSI to the second apparatus on an SL resource related to the SL grant.

In an embodiment, the transmission of the first SR may be triggered by the PHY layer signaling related to the reporting triggering of the SL CSI.

In an embodiment, a buffer status report (BSR) related to the SL CSI for triggering the transmission of the first SR may not be defined, and the transmission of the first SR may not be triggered by the BSR.

In an embodiment, a first SR configuration for the first SR and a second SR configuration for a second SR triggered based on the BSR may be different from each other, and the BSR related to the second SR configuration may be related to at least one of SL data or UL data not related to the SL CSI of the MAC CE format.

For example, if an SR configuration related to SL data and an SR configuration related to SL CSI are configured independently or differently for a mode-1 UE, the mode-1 UE may apply at least any one of the following options. For example, the SR configuration may include information related to an SR resource, information related to a period, and/or information related to a slot offset, or the like.

1) First Option

For example, when the mode-1 UE simultaneously performs transmission related to SL data and transmission related to SL CSI and/or when the mode-1 UE multiplexes the SL data and the SL CSI on one MAC PDU, the mode-1 UE may transmit an SR to a BS, based on only the SR configuration related to the SL data. Herein, a corresponding rule may be useful in a situation in which a BSR related to SL CSI is not defined (unlike in SL data). In this case, for example, the mode-1 UE may omit SR transmission based on the SR configuration related to the SL CSI.

For example, when the mode-1 UE simultaneously performs transmission related to SL data and transmission related to SL CSI and/or when the mode-1 UE multiplexes the SL data and the SL CSI on one MAC PDU, the mode-1 UE may transmit an SR to the BS, based on only the SR configuration related to the SL CSI. In this case, for example, the mode-1 UE may omit SR transmission based on the SR configuration based on the SL data.

2) Second Option

For example, when the mode-1 UE simultaneously performs transmission related to SL data and transmission related to SL CSI and/or when the mode-1 UE multiplexes the SL data and the SL CSI on one MAC PDU, the mode-1 UE may perform both SR transmission based on the SR configuration related to the SL CSI and SR transmission based on the SR configuration related to the SL data.

3) Third Option

For example, when the mode-1 UE simultaneously performs transmission related to SL data and transmission related to SL CSI and/or when the mode-1 UE multiplexes the SL data and the SL CSI on one MAC PDU, the mode-1 UE may apply the second option (or first option) when a remaining latency budget related to SL CSI reporting is not sufficient for a (processing) relay required in SR transmission based on an SR configuration related to SL CSI reporting. Otherwise, the mode-1 UE may apply the first option (or second option).

According to an embodiment of the present disclosure, there is provided a second apparatus for receiving SL CSI. The second apparatus may include at least one memory storing instructions, at least one transceiver, and at least one processor connected to the at least one memory and the at least one transceiver. The at least one processor may control the at least one transceiver to receive, from a first apparatus, SL CSI of a MAC CE format related to a channel state between the first apparatus and the second apparatus.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
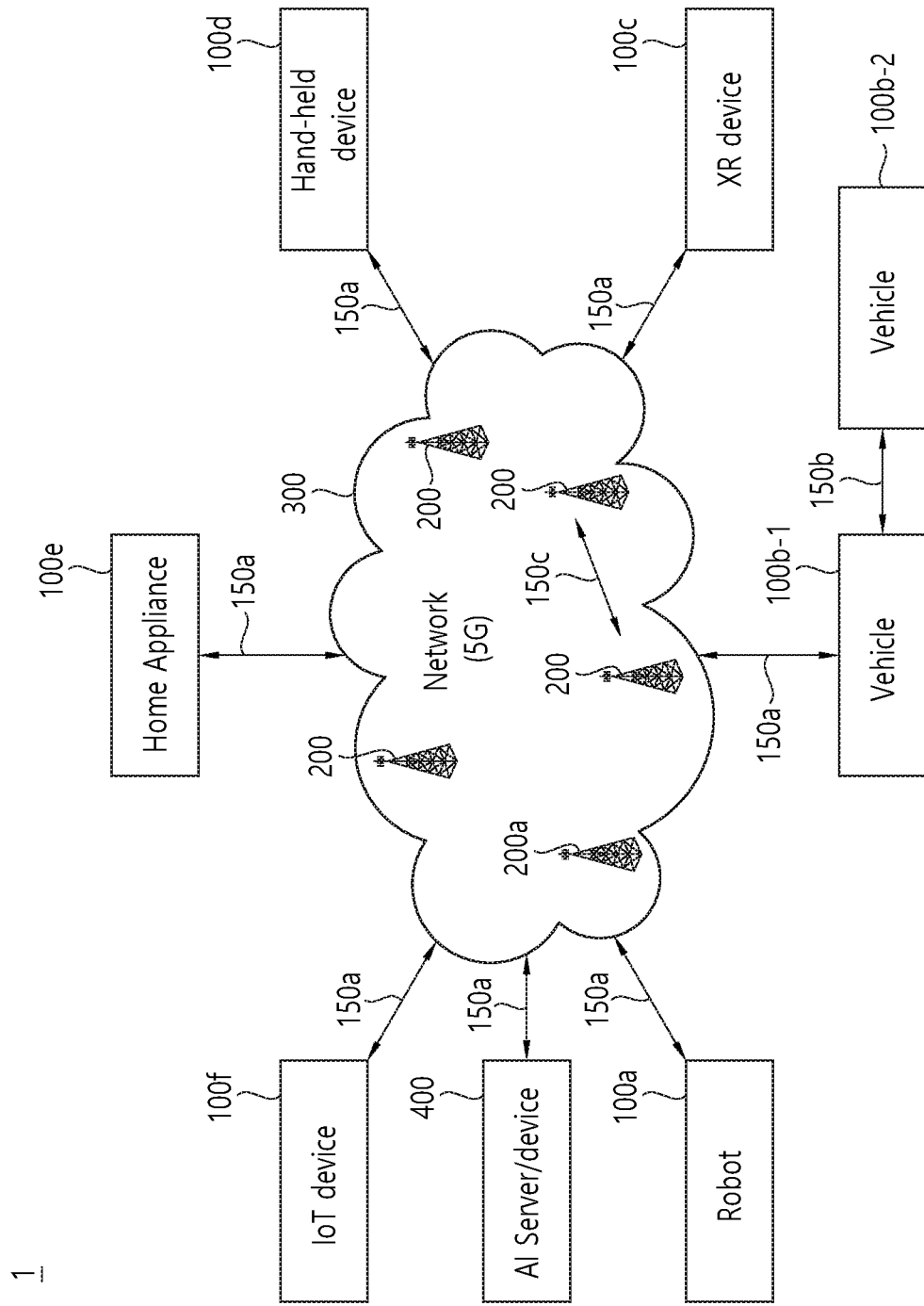
FIG. 18 shows a communication system 1, in accordance with an embodiment of the present disclosure.

FIG. 18 shows a communication system 1, in accordance with an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
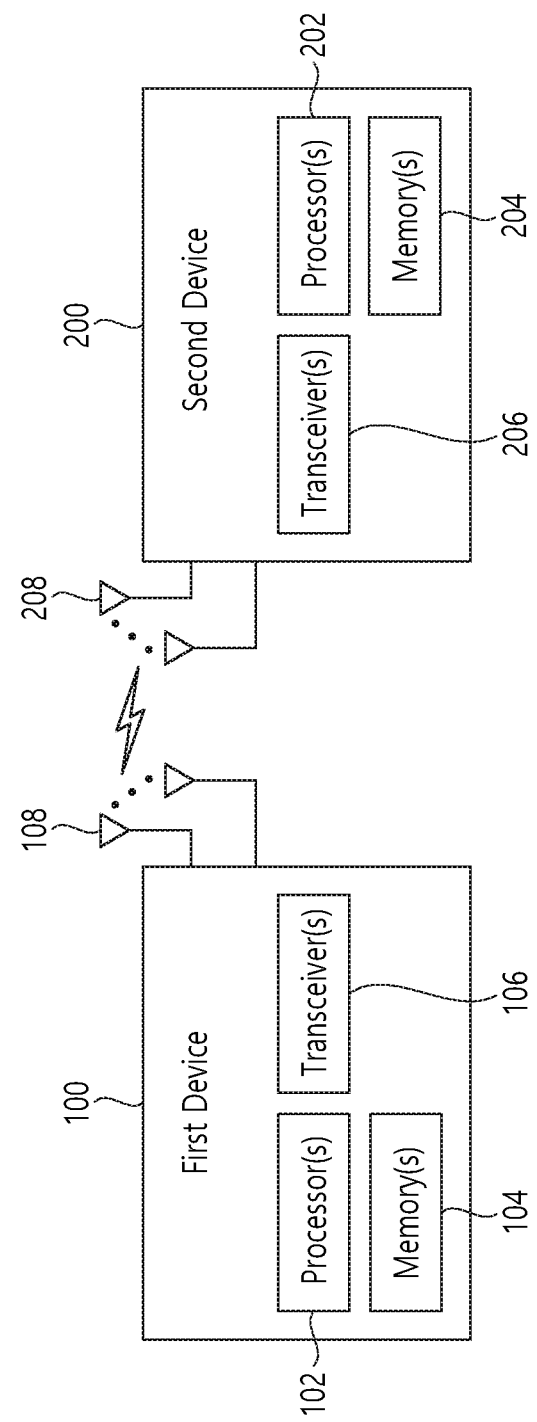
FIG. 19 shows wireless devices, in accordance with an embodiment of the present disclosure.

FIG. 19 shows wireless devices, in accordance with an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
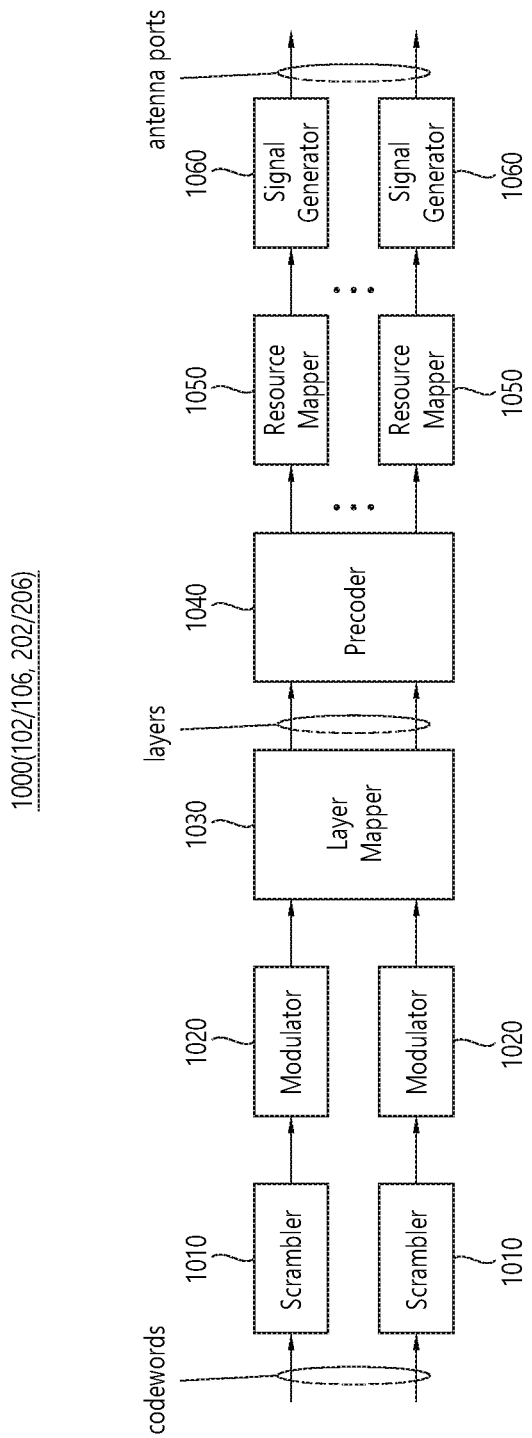
FIG. 20 shows a signal process circuit for a transmission signal, in accordance with an embodiment of the present disclosure.

FIG. 20 shows a signal process circuit for a transmission signal, in accordance with an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed by, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
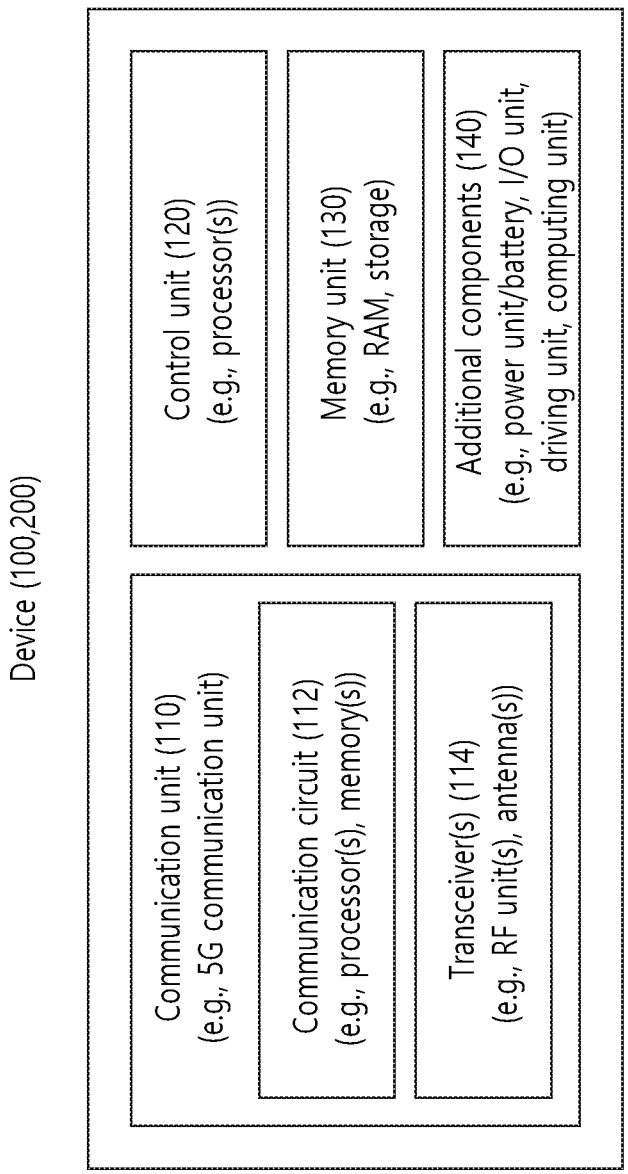
FIG. 21 shows a wireless device, in accordance with an embodiment of the present disclosure.

FIG. 21 shows a wireless device, in accordance with an embodiment of the present disclosure. The wireless device may be implemented in various forms according to a use-case/service (see FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
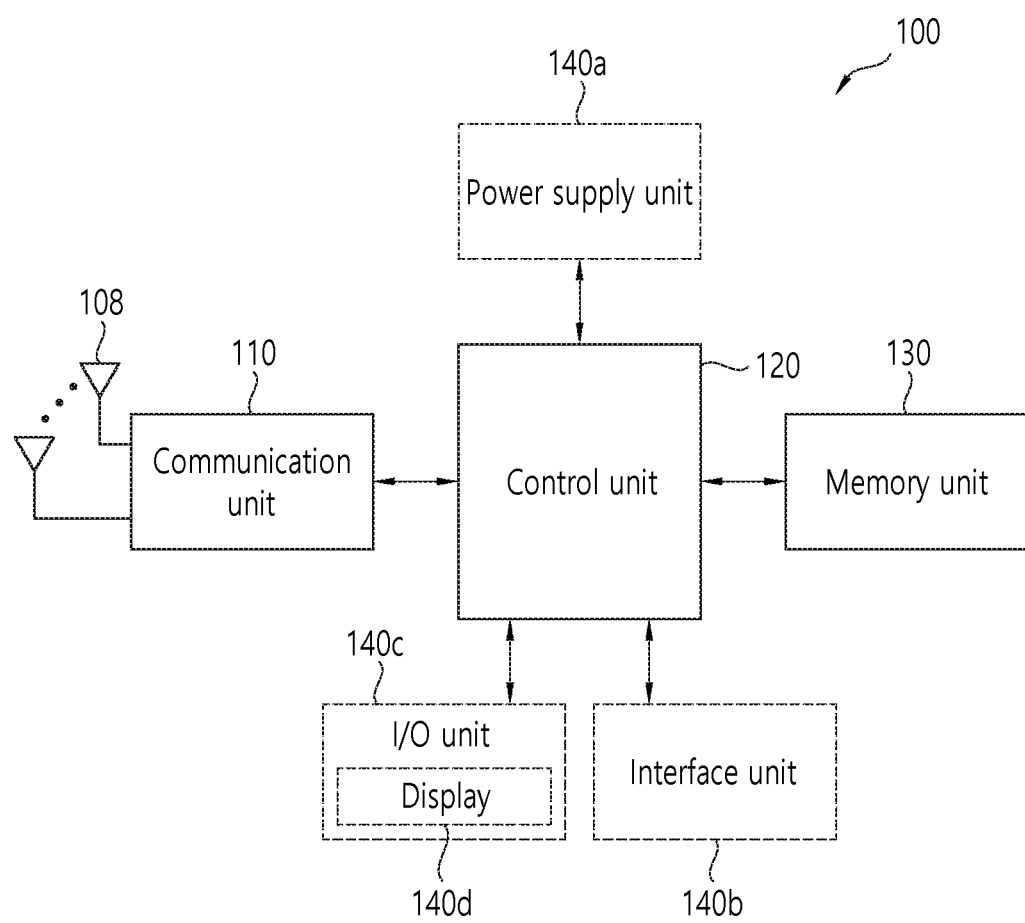
FIG. 22 shows a hand-held device, in accordance with an embodiment of the present disclosure.

FIG. 22 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

Figure 23:
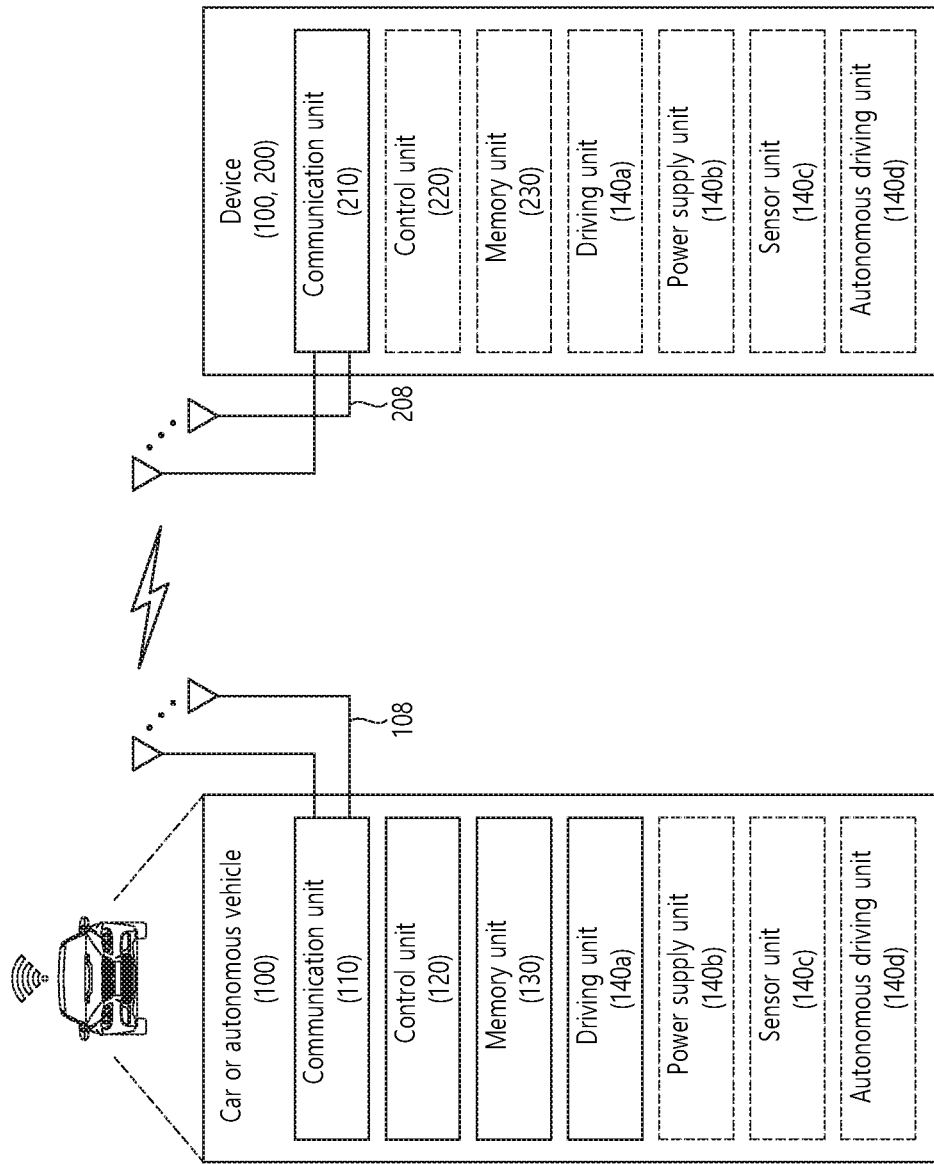
FIG. 23 shows a car or an autonomous vehicle, in accordance with an embodiment of the present disclosure.

FIG. 23 shows a car or an autonomous vehicle, in accordance with an embodiment of the present disclosure. The car or autonomous vehicle may be implemented by a mobile robot, a car, a train, a manned/unmanned Aerial Vehicle (AV), a ship, etc.

Referring to FIG. 23, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method of transmitting sidelink (SL) channel state information (CSI) by a first apparatus, the method comprising:

generating the SL CSI related to a channel state between the first apparatus and a second apparatus in a medium access control (MAC) control element (CE) format; and transmitting the SL CSI in the MAC CE format to the second apparatus through MAC layer signaling, wherein the generating of the SL CSI in the MAC CE format and the transmitting of the SL CSI in the MAC CE format to the second apparatus are triggered by sidelink physical (PHY) layer signaling from the second apparatus related to triggering of the transmitting of the SL CSI in the MAC CE format.

2. The method of claim 1, wherein a priority for the SL CSI of the MAC CE format is predetermined.

3. The method of claim 1, further comprising transmitting a first scheduling request (SR) to a base station, wherein the first SR is triggered by the SL CSI in the MAC CE format, generated by the PHY layer signaling from the second apparatus related to the triggering of the transmitting of the SL CSI.

4. The method of claim 3, further comprising receiving an SL grant from the base station, wherein the SL CSI is transmitted to the second apparatus through the MAC CE on an SL resource related to the SL grant.

5. The method of claim 4, wherein the SL grant is related to the first SR transmitted to the base station.

6. The method of claim 4, further comprising:
transmitting a second SR to the base station;
receiving a UL grant from the base station; and
transmitting the SL CSI to the base station on a UL resource related to the UL grant.

7. The method of claim 6, wherein the SL CSI is transmitted to the base station through the MAC CE on the UL resource.

8. The method of claim 7, wherein the SL CSI is transmitted to the base station, further based on at least one of cases (i) where the SL resource is reselected, (ii) where an SL channel busy ratio (CBR) value is increased compared to a predetermined threshold, (iii) where a reference signal received power (RSRP) value is increased compared to a predetermined threshold, (iv) where the RSRP value is increased compared to a predetermined threshold, (v) where a received signal strength indicator (RSSI) value is increased compared to a predetermined threshold, (vi) where an SL CQI value is increased compared to a predetermined threshold, (vii) where an SL PMI value is increased compared to a predetermined threshold, (viii) where an SL RI value is increased compared to a predetermined threshold, or (ix) where a PC5 RRC connection is established between user equipments (UEs).

9. The method of claim 6, wherein the UL grant is related to the second SR.

10. The method of claim 1, wherein the SL CSI includes at least one of a channel quality indicator (CQI), a precoding matrix indicator (PMI), or a rank indicator (RI).

11. The method of claim 1, wherein the transmitting of the SL CSI to the second apparatus comprises:
   determining an SL resource for transmitting the SL CSI to the second apparatus, based on resource selection; and
   transmitting the SL CSI to the second apparatus through the MAC CE, based on the SL resource.

12. A first apparatus configured to transmit sidelink (SL) channel state information (CSI), the first apparatus comprising:
   at least one memory storing instructions;
   at least one transceiver; and
   at least one processor connected to the at least one memory and the at least one transceiver,
   wherein the at least one processor is configured to:
   generate the SL CSI related to a channel state between the first apparatus and a second apparatus in a medium access control (MAC) control element (CE) format; and
   control the at least one transceiver to transmit the SL CSI in the MAC CE format to the second apparatus through MAC layer signaling,
   wherein the generating of the SL CSI in the MAC CE format and the transmitting of the SL CSI in the MAC CE format to the second apparatus are triggered by sidelink physical (PHY) layer signaling from the second apparatus related to triggering of the transmitting of the SL CSI in the MAC CE format.

13. A processing device configured to control a first terminal to transmit sidelink (SL) channel state information (CSI), the processing device comprising:
   at least one processor; and
   at least one computer memory operably connectable to the at least one processor, and storing instructions that, based on being executed by the at least one processor, perform operations comprising:
   generating the SL CSI related to a channel state between the first terminal and a second terminal in a medium access control (MAC) control element (CE) format; and
   transmitting the SL CSI in the MAC CE format to the second terminal through MAC layer signaling,
   wherein the generating of the SL CSI in the MAC CE format and the transmitting of the SL CSI in the MAC CE format to the second terminal are triggered by sidelink physical (PHY) layer signaling from the second terminal related to triggering of the transmitting of the SL CSI in the MAC CE format.

* * * * *